March 21, 1939.　　　　K. HALLE　　　　2,151,596
VALVE
Filed Aug. 14, 1937　　　2 Sheets-Sheet 1

Inventor:
K. Halle
By E. F. Wenderoth
Atty

March 21, 1939.          K. HALLE          2,151,596
VALVE
Filed Aug. 14, 1937          2 Sheets-Sheet 2

Inventor:
K. Halle,
By E. F. Wenderoth
Atty

Patented Mar. 21, 1939

2,151,596

UNITED STATES PATENT OFFICE 2,151,596

VALVE

Kurt Halle, Berlin-Zehlendorf-West, Germany, assignor to Dinglerwerke Aktiengesellschaft, Zweibrucken, (Pfalz), Germany Application August 14, 1937, Serial No. 159,188
In Germany August 28, 1936

2 Claims. (Cl. 251—167)

This invention relates to valves and more particularly, but not exclusively to sliding gate or sluice valves and the like. With cut-off devices, more especially sluice valves, it is frequently necessary to be able to ascertain whether the valve makes a perfectly tight closure when shut off, while the possibility should also be afforded of conducting away any leakage of the liquid or gaseous operating medium which may occur. This applies more especially to valves which are located directly in front of connected machines or apparatus which, when not in operation, require to be protected from leakages through the valve in order to avoid, for example, corrosion or unpermissible increases in pressure or the like. This also applies when inspection, repairs or the like have to be carried out behind the valve, because, if such operations are to be carried out without danger or disturbance, it is usually necessary that there should be no leakage through the valve.

For achieving this result one of two possible expedients has usually been adopted. As a rule, two valves are arranged in series and the chamber between them when they are shut off is relieved from pressure by opening one or more draining cocks, in order to obtain not only a check as to the tightness of the first of the two valves but also in order to lead away any leakage and to keep it from the second valve and thus also from the part of the installation to be protected, for example from the place where repairs are to be effected.

Another possibility of fulfilling the above-described requirement consists in employing a single sliding or sluice valve of special construction having two sliding plates with which, owing to its special construction the pressure on both the sliding plates is so great that tightness is ensured in both directions, and therefore against the pressure of the operating medium. With this arrangement a drain cock on the valve casing itself can be opened and the casing thereby relieved from pressure. This drain cock serves therefore for providing a check on the tightness of the valve and for leading off any leakage.

Such sliding valves of which the casing can be relieved from pressure are difficult to construct, must withstand high stress, and are consequently expensive, while in the case of the arrangement of two valves in series a more simple valve or slide valve can be used. In the latter case, when sliding or sluice valves are employed, the valves usually utilized (apart from wedge slide valves) are either valves which are self-sealing under the influence of the pressure of the operating medium on one side, or preferably valves in which a supplementary sealing pressure is provided by means of springs, wedges, or the like. The arrangement of two valves in series, apart from the high cost, is frequently impossible owing to the space available being insufficient.

The disadvantages of high costs, complicated and expensive construction and large space requirements are obviated by the present invention, according to which the valve plug or the sliding plate or plates of the valve on the one hand and the casing of the valve on the other hand are each provided with a plurality of sealing surfaces, namely an internal and one or more external sealing surfaces which may be disposed, for example concentrically one to another. With this arrangement, the sealing surfaces on the casing coact with the corresponding sealing surfaces on the valve plug or sliding plate. In accordance with a further feature of the invention there is formed between the internal and external sealing surface of each pair of sealing surfaces of the casing an annular chamber which, when the valve is closed, is likewise closed, and thus represents a chamber which is separated both from the casing proper and from its flanged connecting members. This annular chamber can be relieved from pressure when the valve has been closed and used for providing a check on the tightness of the closure of the valve and if necessary for leading away any leakage. The annular chamber can be used also in a reverse sense for introducing a sealing liquid or a sealing gas between the pairs of sealing surfaces in order to guarantee perfect sealing which is of special importance for example in the case of gas sliding or sluice valves.

A particular advantage of the invention is that the sealing surfaces on both sides of the annular chamber are pressed tightly against one another by the pressure of the pressure medium, so that the application of additional pressure on the sliding plate may be dispensed with. With the above-mentioned arrangement of two slide plates in series only the first valve can be self-sealing, while good sealing by the second valve is possible only if additional pressure is applied.

Various forms of sliding plate and plug valves constructed in accordance with the invention are illustrated diagrammatically and by way of example in the accompanying drawings, in which Figure 1 is a cross-section through a sliding plate valve provided with seating surfaces only on one side of the plate.

In all the figures like parts are denoted by like reference numerals.

Figure 1:
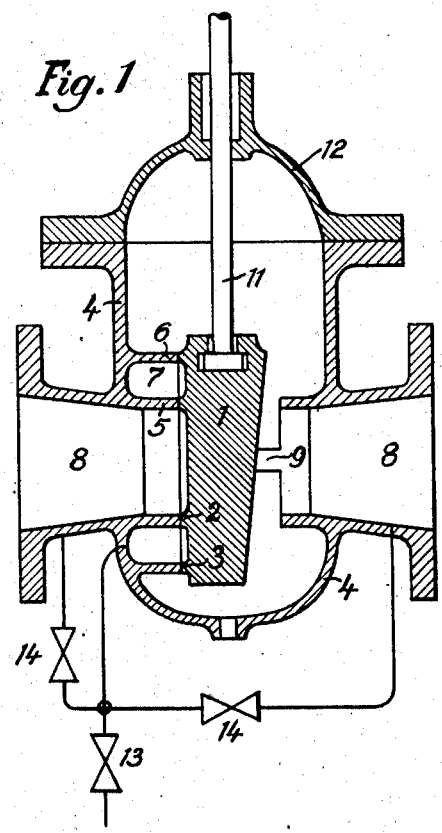

Referring to drawings, the valve comprises a casing 4 which is provided with a cover 12 and with flanged connecting pieces 8 which are made in one piece with the casing 4. Within the casing is fitted a sliding plate 1 which can be moved by means of a valve spindle 11 which is connected to it. The plate 1 is provided on one side with inner sealing or seating surfaces 2 and with outer sealing or seating surfaces 3 while the casing 4 is provided with corresponding sealing or seating surfaces 5 and 6 which coact respectively with the surfaces 2 and 3. When the valve is closed, the surfaces 2 and 3 seat themselves against the surfaces 5 and 6, and these surfaces form between them an annular chamber 7 which is shut off both from the interior of the casing 4 and from the flanged connections 8. To the annular chamber 7 is connected a pipe leading to the drain cock 13 by which any liquid or gas which leaks past the seating surface can be drawn off, or alternatively gas or liquid can be admitted for the purpose of forming a seal. A pipe provided with by-pass valves 14 may also be connected to the connections 8 on either side of the valve casing. The casing 4 may also be provided with a wedge-like projection 9 which presses the sliding plate 1 firmly against its seating. If the pressure exerted on the sliding plate is increased sufficiently, for example by means of the wedge member 9, the valve can be used for cutting off the flow of pressure medium in either direction.

Figure 2:
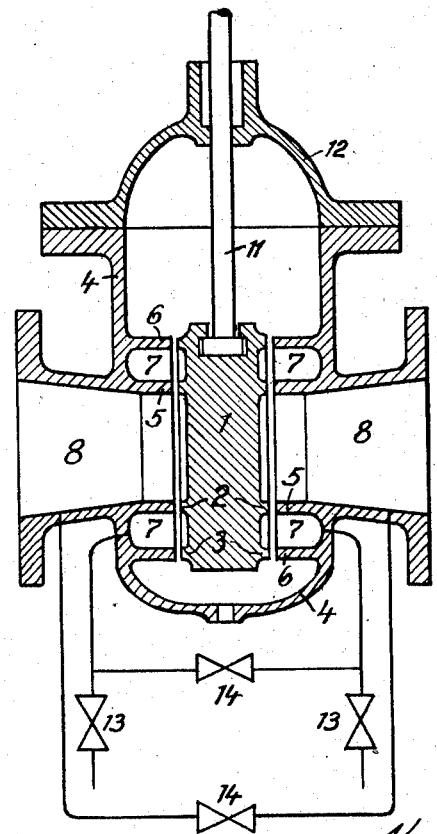
Figure 2 is a similar section through a valve which is provided with seating surfaces on both sides.

In Figure 2 the construction is similar to that illustrated in Figure 1 except that the sliding plate 1 is provided on both sides with seating surfaces 2 and 3 which coact respectively with seating surfaces 5 and 6 which are also provided on both sides of the valve casing. An annular chamber 7 is thus formed on both sides of the valve and these chambers are connected by means of pipes to drain cocks 13. By-pass valves 14 may also be provided where indicated between both sides of the valves.

Figure 3:
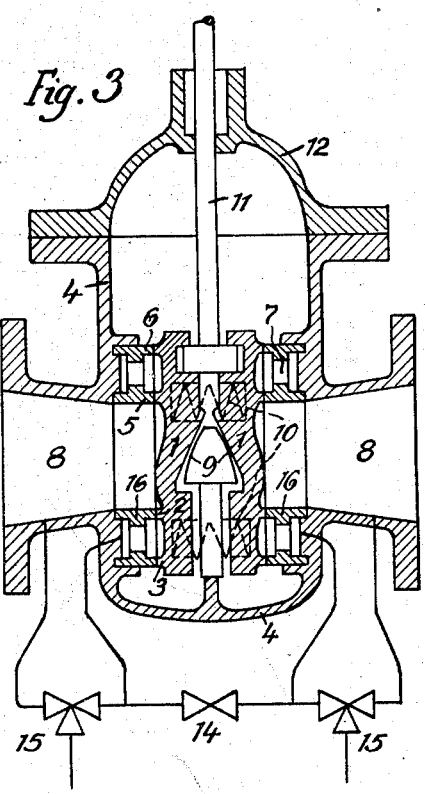
Figure 3 shows in cross-section a modified form of construction having means whereby additional pressure can be exerted on the plate.

In the form of construction illustrated in Figure 3, the valve again makes a tight closure by means of seatings provided on both sides. In this construction the closure member comprises two sliding plates, or a sliding plate made in two parts, and additional pressure is exerted on the plates by means of the wedge 9 and springs 10. The additional pressure which is exerted on the sliding plates need, however, only be relatively slight since the plate is self-sealing on one side owing to the pressure existing on this side. The construction illustrated in this figure also differs in that the seating surfaces between which the annular chambers 7 are situated are formed by means of separately inserted pieces 16, which also form or carry the inner and outer seating surfaces of the casing.

Figure 4:
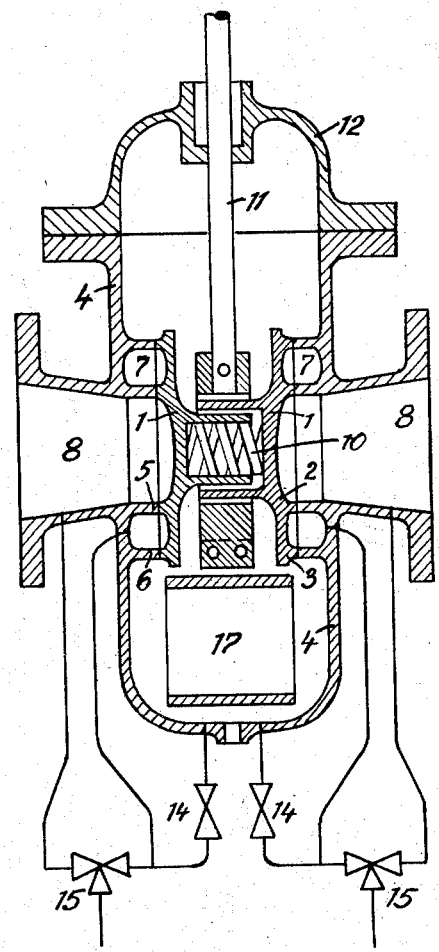
Figure 4 is a cross-sectional view of a further modification.

Figure 4 illustrates a slightly different form of construction of a valve which makes a tight closure on both sides. The valve shown in this figure has two sliding plates 1 and additional pressure is obtained by means of a spring 10 which is introduced between them. The sliding plates are constructed in the form of a regular body of revolution whereby the possibility is afforded of making the sliding places resilient either as a whole or at least between the inner and outer seating surfaces in order to obtain a uniform seating and therefore perfect sealing at both places.

Instead of rigid packing rings or seatings, resilient rings could of course be employed. The arrangement of Figure 4 is also provided with a by-pass 17 which can be introduced between the connections 8.

I claim:

1. A valve comprising a closure member made in two parts and movable in a fixed casing, a plurality of sealing surfaces on each of said parts, a plurality of similar sealing surfaces on said casing with which said former sealing surfaces coact to form closed chambers and means between said parts for pressing the sealing surfaces on said parts against the sealing surfaces on the casing and drain pipes connected to each of said closed chambers.

2. A valve comprising two plates, a plurality of concentric sealing surfaces on each of said plates, a plurality of similar sealing surfaces on said casing with which said former sealing surfaces coact to form closed annular chambers, and a wedge between said plates for pressing them against the sealing surfaces on the casing.

KURT HALLE.